April 10, 1934.   W. C. EDWARDS   1,954,073
AGITATOR FOR THE FREEZING TRAYS OF MECHANICAL REFRIGERATORS
Filed Aug. 26, 1932
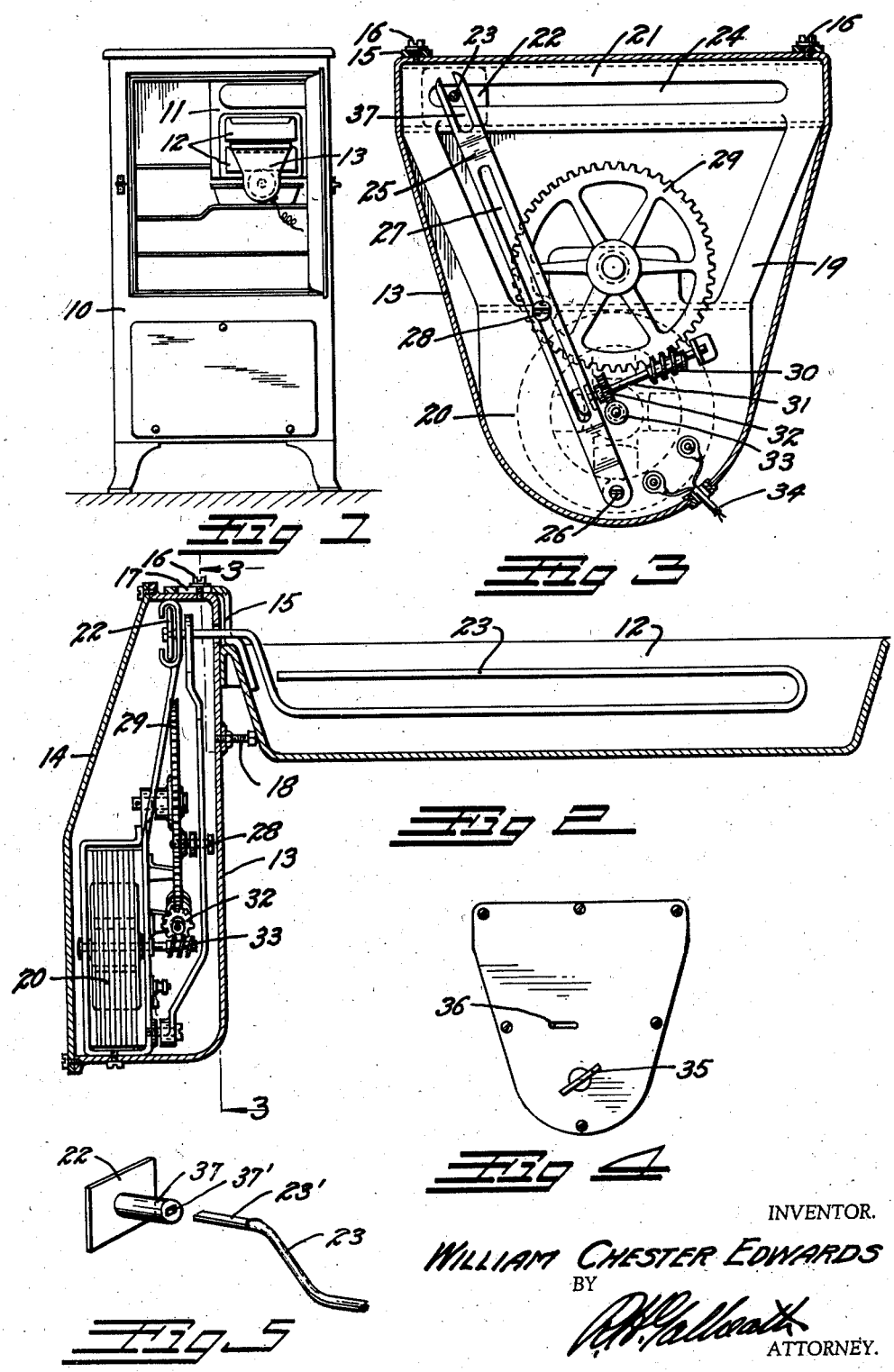
INVENTOR.
WILLIAM CHESTER EDWARDS
BY
ATTORNEY.

Patented Apr. 10, 1934

1,954,073

UNITED STATES PATENT OFFICE 1,954,073

AGITATOR FOR THE FREEZING TRAYS OF MECHANICAL REFRIGERATORS

William Chester Edwards, Denver, Colo.

Application August 26, 1932, Serial No. 630,527

6 Claims. (Cl. 259—113)

This invention relates to a device to be used in connection with the freezing pans of a mechanical refrigerator, to agitate the contents thereof during the freezing process.

The freezing pans of mechanical refrigerators are often used for making frozen desserts, ice creams, sherbets, etc. Their use for this purpose is not satisfactory since during the freezing process, the water will separate from the remaining contents, and freeze either in a layer over the top or bottom or in ice crystals intermixed with the other contents. This separating or crystallization may be avoided if the contents of the pan is stirred at frequent intervals. If this is done by hand, it is very inconvenient and it is necessary to frequently open the door of the refrigerator. This results in the constant admission of heat and interferes with efficient freezing.

The principal object of this invention is to provide a motor driven device which can be quickly and easily hung upon the extremity of a refrigerator freezing pan and which will operate to continuously agitate the contents thereof.

Another object of the invention is to so construct the device that it will be sufficiently small and compact to fit within the narrow space usually allowed between the door of the refrigerator and the freezing pans thereof.

A further object is to so construct the device that it will be adjustable to pans of various shapes.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

Fig. 1 illustrates a typical mechanical refrigerator with its door open to show the position of the invention therein.

Fig. 2 is a longitudinal section through a typical freezing pan, and through the invention as applied to one extremity thereof.

Fig. 3 is a vertical section taken on the line 3—3, Fig. 2.

Fig. 4 is a front view of an alternate form of the invention.

Fig. 5 is a detail view illustrating a method for connecting the agitating arm to the cross head of the device.

In the drawing, a typical mechanical refrigerator is illustrated at 10, with its freezing element at 11 and its freezing pans at 12.

The invention comprises a housing 13, closed at its front by means of a front plate 14. The housing 13 is provided with suitable brackets 15 which extend over and engage the edge of the freezing pan 12, as shown in Fig. 2. The brackets 15 are secured to the housing 13 by means of suitable clamp screws 16 which pass through slotted openings 17 in the brackets. The slotted openings allow the brackets to be moved toward or away from the housing to fit them to pan rims of different sizes and thicknesses.

The usual freezing pan is inclined inwardly toward the bottom as illustrated in Fig. 2. In order to hold the device 13 vertical on such an inclined pan, a projecting set screw 18 is provided which can be set to contact with the pan to maintain the housing 13 vertical. In applying the device to the pan, it is only necessary to hook the brackets to the pan edge and allow the weight thereof to swing the set screws 19 into contact with the pan.

Within the housing 13, a motor frame 19 is positioned, in which a motor 20 is carried. The motor frame 19 supports a horizontal slide 21 in which a cross head 22 is arranged to reciprocate. An agitating arm 23 projects from the cross head 22 through an elongated slot 24 in the slide 21, and through a similar slot in the housing 13, into the freezing pan 12.

The agitator may have any desired design. A simple wire-like rod extending outwardly from the cross head then downwardly into said pan, thence substantially the entire length of the freezing pan parallel with the bottom thereof and turned back upon itself to form a flattened loop, as illustrated, has been found to be very satisfactory.

The cross head 22 is reciprocated back and forth in the slide 21 by means of an oscillating arm 25 which is pivoted at the lower extremity of the motor housing 19, as shown at 26. The upper extremity of the arm 25 is bifurcated, as shown at 37, so as to engage the agitating arm 23 adjacent the cross head 22. The oscillating arm is provided with a longitudinal slot 27 into which a crank pin 28 extends. The crank pin 28 projects from the periphery of a driven gear 29 which is journalled in the motor frame 19.

The driven gear 29 is rotated by means of a worm 30 carried on a worm shaft 31. The worm shaft 31 is driven through the medium of a worm gear 32 which meshes with a drive worm 33 on the shaft of the motor 20. Current is supplied to the motor through a suitable conductor cord 34.

The device occupies but small space and can be readily lifted from the freezing pan when it is not needed. It is easily washed and easily removable from the frozen contents.

While the preferred form embodies an electric motor, it can also be manufactured with a spring motor if desired. The spring motor would occupy the position of the electric motor and, as illustrated in Fig. 4, would be provided with a suitable winding key 35 and control lever 36.

It can be readily seen that as the motor operates, the driven gear 29 will be slowly rotated. As the gear 29 rotates, the crank pin 28 will describe an orbit and will travel in the slot 27 of the arm 25. This causes the arm 25 to slowly oscillate back and forth. The oscillation of the arm will be transmitted to the cross head 22 to cause the agitator 23 to move slowly back and forth across the pan in a horizontal plane parallel with the pan bottom, so as to provide an efficient agitation throughout the entire pan contents.

It is preferred to form a detachable joint between the cross head 22 and the agitating arm 23, in order to allow various agitating arms to be interchanged and to facilitate their removal for washing. This may be accomplished forming a sleeve 37 on the cross head with a suitable socket 37′ for receiving the agitating arm. The extremity of the agitating arm is suitably shaped such as indicated at 23′ to fit the socket 37′. Means may be provided for locking the arm in the socket if desired, for instance, a set screw. It has however, been found that the far end of the freezing pan effectively prevents the agitator from moving from the sleeve 37.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. An agitator for attachment to the freezing pan of a refrigerator comprising: a motor support; means for detachably suspending said motor support from one edge of said pan; a horizontal slide carried by said motor support; a cross head adapted to reciprocate in said slide; an agitating member extending from said cross head into said pan so as to move in a plane parallel with the bottom thereof; a motor; a rotatable member driven by said motor; a projection on said rotating member; and a lever pivoted adjacent its one extremity and connected to said agitating member at its other extremity, said lever being provided with a longitudinal slot to receive the projection on said rotating member so that rotation of the latter will oscillate said lever and reciprocate said cross head.

2. An agitating device for the freezing pan of a mechanical refrigerator comprising: a horizontal slide member; means for supporting said slide member in front of the front edge of said pan so that it will extend in parallel spaced-relation to said edge; a cross head arranged to slide longitudinally of said slide member; an agitating arm extending from said cross head over the said front edge of said pan, thence downwardly and rearwardly, substantially parallel to the bottom of said pan, said agitating arm being supported entirely by said cross head; and means for reciprocating said cross head longitudinally of said slide so as to move said agitating arm laterally of said pan.

3. An agitating device for the freezing pan of a mechanical refrigerator comprising: a horizontal slide member; means for supporting said slide member in front of the front edge of said pan so that it will extend in parallel spaced-relation to said edge; a cross head arranged to slide longitudinally of said slide member; an agitating arm extending from said cross head over the said front edge of said pan, thence downwardly and rearwardly, substantially parallel to the bottom of said pan, said agitating arm being supported entirely by said cross head; a lever pivoted at its lower extremity below said slide; a bifurcation in the upper extremity of said lever adapted to engage said arm; and means for swinging said lever so that said furcations will push said cross head along said slide.

4. An agitating device for the freezing pan of a mechanical refrigerator comprising: a horizontal slide member; means for supporting said slide member in front of the front edge of said pan so that it will extend in parallel spaced-relation to said edge; a cross head arranged to slide longitudinally of said slide member; an agitating arm extending from said cross head over the said front edge of said pan, thence downwardly and rearwardly, substantially parallel to the bottom of said pan, said agitating arm being supported entirely by said cross head; a lever pivoted at its lower extremity below said slide; a bifurcation in the upper extremity of said lever adapted to engage said arm; a rotating member positioned between said slide and the pivot point of said lever; and a projection on said rotating member arranged to travel in a longitudinal slot in said lever as said rotating member rotates.

5. An agitating device for the freezing pan of a mechanical refrigerator comprising: a horizontal slide member; means for supporting said slide member in front of the front edge of said pan so that it will extend in parallel spaced-relation to said edge; a cross head arranged to slide longitudinally of said slide member; an agitating arm extending from said cross head over the said front edge of said pan, thence downwardly and rearwardly, substantially parallel to the bottom of said pan, said agitating arm being supported entirely by said cross head; a lever pivoted at its lower extremity below said slide; a bifurcation in the upper extremity of said lever adapted to engage said arm; a rotating member positioned between said slide and the pivot point of said lever; a projection on said rotating member arranged to travel in a longitudinal slot in said lever as said rotating member rotates; a housing enclosing said slide lever and rotating member; and hooks projecting forwardly from said housing so as to extend over the forward edge of said pan.

6. An agitating device for the freezing pan of a mechanical refrigerator comprising: a horizontal slide member; means for supporting said slide member in front of the front edge of said pan so that it will extend in parallel spaced-relation to said edge; a cross head arranged to slide longitudinally of said slide member; an agitating arm extending from said cross head over the said front edge of said pan, thence downwardly and rearwardly, substantially parallel to the bottom of said pan, said agitating arm being supported entirely by said cross head; a lever pivoted at its lower extremity below said slide; a bifurcation in the upper extremity of said lever adapted to engage said arm; a rotating member positioned between said slide and the pivot point of said lever; a projection on said rotating member arranged to travel in a longitudinal slot in said lever as said rotating member rotates; a housing enclosing said slide lever and rotating member; hooks projecting forwardly from said housing so as to extend over the forward edge of said pan; and means extending forwardly from said housing into engagement with said pan so as to maintain said agitating arm parallel with the bottom of said pan.

WILLIAM CHESTER EDWARDS.